(12) United States Patent
Nagano

(10) Patent No.: US 7,043,592 B2
(45) Date of Patent: May 9, 2006

(54) EXTERNAL BUS CONTROLLER

(75) Inventor: Makoto Nagano, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 232 days.

(21) Appl. No.: 10/247,355

(22) Filed: Sep. 20, 2002

(65) Prior Publication Data

US 2003/0145149 A1    Jul. 31, 2003

(30) Foreign Application Priority Data

Jan. 30, 2002   (JP) ............................. 2002-020982

(51) Int. Cl.
  *G06F 13/38*    (2006.01)
  *G06F 13/14*    (2006.01)
  *G06F 13/40*    (2006.01)
  *G06F 13/36*    (2006.01)

(52) U.S. Cl. ...................... 710/307; 710/305; 710/306; 710/66

(58) Field of Classification Search ........ 710/305–306, 710/307, 66
See application file for complete search history.

(56) References Cited

U.S. PATENT DOCUMENTS

| | | | | |
|---|---|---|---|---|
| 5,113,369 A | * | 5/1992 | Kinoshita .................... | 710/307 |
| 5,454,084 A | * | 9/1995 | Uchikoga .................... | 710/303 |
| 5,613,078 A | * | 3/1997 | Kishigami ................... | 710/307 |
| 5,617,559 A | | 4/1997 | Le et al. | |
| 5,651,138 A | | 7/1997 | Le et al. | |
| 5,692,159 A | * | 11/1997 | Shand ........................ | 703/27 |
| 5,768,546 A | * | 6/1998 | Kwon ........................ | 710/307 |
| 5,911,053 A | * | 6/1999 | Pawlowski et al. ......... | 710/307 |
| 6,014,720 A | * | 1/2000 | Wang et al. ................ | 710/307 |
| 6,047,347 A | * | 4/2000 | Hansen et al. ............. | 710/307 |
| 6,381,664 B1 | * | 4/2002 | Nishtala et al. ............. | 710/305 |
| 6,721,840 B1 | * | 4/2004 | Allegrucci .................. | 710/306 |
| 6,751,751 B1 | * | 6/2004 | Murray et al. ................ | 714/34 |
| 6,754,760 B1 | * | 6/2004 | Yee et al. .................... | 710/307 |

FOREIGN PATENT DOCUMENTS

| | | |
|---|---|---|
| JP | 05-151075 | 6/1993 |
| JP | 8-77098 | 3/1996 |
| JP | 09-101934 | 4/1997 |

OTHER PUBLICATIONS

Triscend, 32-bit Configurable System-on-Chip, Nov. 2001, www.triscend.com.*

* cited by examiner

*Primary Examiner*—Rehana Perveen
*Assistant Examiner*—Christopher Daley
(74) *Attorney, Agent, or Firm*—Volentine Francos & Whitt, PLLC

(57) ABSTRACT

An external bus controller which is configured such that, when an external device having a data width smaller than that of an external bus is connected to the external bus, the signal lines of the external bus can be freely selected. This external bus controller includes a first exchange, which converts the data width of input/output data so as to compensate for differences between the data width of the internal bus and the data width of an external device, and a second exchange, which exchanges signal lines between the first exchange and the used signal lines. The signal lines to be used are set for each external device using configuration pins or similar means.

25 Claims, 10 Drawing Sheets

FIG.3

| No. | Data Bus Configuration Pin | | ROM Data Width | | |
|---|---|---|---|---|---|
| | s_rom1 | s_rom0 | 8 bit | 16 bit | 32 bit |
| 1 | 0(low) | 0(low) | xd 0 – xd7 | xd 0 – xd15 | xd 0 – xd31 |
| 2 | 0(low) | 1(high) | xd 8 – xd15 | | |
| 3 | 1(high) | 0(low) | xd16 – xd23 | xd16 – xd31 | |
| 4 | 1(high) | 1(high) | xd24 – xd31 | | |

FIG.4

| No. | Data Bus Configuration Pin | | SRAM Data Width | | |
|---|---|---|---|---|---|
| | s_sram1 | s_sram0 | 8 bit | 16 bit | 32 bit |
| 1 | 0(low) | 0(low) | xd 0 – xd7 | xd 0 – xd15 | xd 0 – xd31 |
| 2 | 0(low) | 1(high) | xd 8 – xd15 | | |
| 3 | 1(high) | 0(low) | xd16 – xd23 | xd16 – xd31 | |
| 4 | 1(high) | 1(high) | xd24 – xd31 | | |

FIG.5

| No. | Data Bus Configuration Pin | | SDRAM Data Width | | |
|---|---|---|---|---|---|
| | s_sdram1 | s_sdram0 | 8 bit | 16 bit | 32 bit |
| 1 | 0(low) | 0(low) | xd 0 – xd7 | xd 0 – xd15 | xd 0 – xd31 |
| 2 | 0(low) | 1(high) | xd 8 – xd15 | | |
| 3 | 1(high) | 0(low) | xd16 – xd23 | xd16 – xd31 | |
| 4 | 1(high) | 1(high) | xd24 – xd31 | | |

FIG.6

| No. | Data Bus Configuration Pin | | EDO DRAM Data Width | | |
|---|---|---|---|---|---|
| | s_edo1 | s_edo0 | 8 bit | 16 bit | 32 bit |
| 1 | 0(low) | 0(low) | xd 0 – xd7 | xd 0 – xd15 | xd 0 – xd31 |
| 2 | 0(low) | 1(high) | xd 8 – xd15 | | |
| 3 | 1(high) | 0(low) | xd16 – xd23 | xd16 – xd31 | |
| 4 | 1(high) | 1(high) | xd24 – xd31 | | |

FIG. 7

| No. | Data Bus Configuration Pin | | I/O Circuit Data Width | | |
|---|---|---|---|---|---|
| | s_io1 | s_io0 | 8 bit | 16 bit | 32 bit |
| 1 | 0(low) | 0(low) | xd 0 – xd7 | xd 0 – xd15 | xd 0 – xd31 |
| 2 | 0(low) | 1(high) | xd 8 – xd15 | | |
| 3 | 1(high) | 0(low) | xd16 – xd23 | xd16 – xd31 | |
| 4 | 1(high) | 1(high) | xd24 – xd31 | | |

FIG. 11

| r_io1 | r_io0 | r_edo1 | r_edo0 | r_sdram1 | r_sdram0 | r_sram1 | r_sram0 | r_rom1 | r_rom0 |
|---|---|---|---|---|---|---|---|---|---|
| | | | | | | | | | |

FIG. 12

| No. | Data Bus Configuration Pin | | ROM Data Width | | |
| --- | --- | --- | --- | --- | --- |
| | s_rom1 | s_rom0 | 8 bit | 16 bit | 32 bit |
| 1 | 0 | 0 | xd 0 – xd7 | xd 0 – xd15 | xd 0 – xd31 |
| 2 | 0 | 1 | xd 8 – xd15 | | |
| 3 | 1 | 0 | xd16 – xd23 | xd16 – xd31 | |
| 4 | 1 | 1 | xd24 – xd31 | | |

FIG. 13

| No. | Data Bus Configuration Pin | | SRAM Data Width | | |
| --- | --- | --- | --- | --- | --- |
| | s_sram1 | s_sram0 | 8 bit | 16 bit | 32 bit |
| 1 | 0 | 0 | xd 0 – xd7 | xd 0 – xd15 | xd 0 – xd31 |
| 2 | 0 | 1 | xd 8 – xd15 | | |
| 3 | 1 | 0 | xd16 – xd23 | xd16 – xd31 | |
| 4 | 1 | 1 | xd24 – xd31 | | |

| No. | Data Bus Configuration Pin | | 8 bit | SDRAM Data Width 16 bit | 32 bit |
|---|---|---|---|---|---|
| | s_sdram1 | s_sdram0 | | | |
| 1 | 0 | 0 | xd 0 – xd7 | xd 0 – xd15 | xd 0 – xd31 |
| 2 | 0 | 1 | xd 8 – xd15 | | |
| 3 | 1 | 0 | xd16 – xd23 | xd16 – xd31 | |
| 4 | 1 | 1 | xd24 – xd31 | | |

FIG. 14

| No. | Data Bus Configuration Pin | | 8 bit | EDO DRAM Data Width 16 bit | 32 bit |
|---|---|---|---|---|---|
| | s_edo1 | s_edo0 | | | |
| 1 | 0 | 0 | xd 0 – xd7 | xd 0 – xd15 | xd 0 – xd31 |
| 2 | 0 | 1 | xd 8 – xd15 | | |
| 3 | 1 | 0 | xd16 – xd23 | xd16 – xd31 | |
| 4 | 1 | 1 | xd24 – xd31 | | |

FIG. 15

| No. | Data Bus Configuration Pin | | I/O Circuit Data Width | | | | |
|---|---|---|---|---|---|---|---|
| | s_io1 | s_io0 | 8 bit | | | 16 bit | 32 bit |
| 1 | 0 | 0 | xd0 – xd7 | | | xd0 – xd15 | xd0 – xd31 |
| 2 | 0 | 1 | xd8 – xd15 | | | xd16 – xd31 | |
| 3 | 1 | 0 | xd16 – xd23 | | | | |
| 4 | 1 | 1 | xd24 – xd31 | | | | |

FIG. 16

EXTERNAL BUS CONTROLLER

BACKGROUND OF THE INVENTION

1. Field of the Invention

This invention relates to an external bus controller. This invention is applied to, for example, system LSIs (large-scale integrated circuits), semiconductor chips comprising only an external bus controller, and similar.

2. Description of Related Art

In ordinary system LSIs, in addition to a CPU (central processing unit), internal memory and other integrated circuits, an external bus controller is provided. The CPU, internal memory, external bus controller, and other circuit blocks are interconnected using an internal bus. An internal bus is a bus provided within the system LSI, and comprises a data bus, address bus and control bus.

The external bus controller is connected to an external bus. An external bus is a bus used for interconnection of devices (semiconductor chips or other types of devices). An external bus comprises a data bus, address bus and control bus.

The data width of the data bus comprised by the external bus and the data width of a device need not be the same. For example, a 32-bit data bus can be connected to a 16-bit or an 8-bit device. When a 32-bit data bus is connected to a 32-bit device, all of the bits 0 to 31 of the data bus are connected to the device. However, when a 16-bit device is connected to a 32-bit data bus, the bits 0 to 15 of the data bus are connected to the device, and bits 16 to 31 are not connected to the device. And, when an 8-bit device is connected to a 32-bit data bus, the bits 0 to 7 of the data bus are connected to the device, and the bits 8 to 31 are not connected to the device.

When devices with a variety of data widths are connected to one external data bus, there is variation in the number of input/output terminals connected to each of the signal lines of the external data bus. For example, when an 8-bit device, a 16-bit device and a 32-bit device are connected to a 32-bit external data bus, bits 0 to 7 are connected to three devices, bits 8 to 15 are connected to two devices, and bits 16 to 32 are connected to only one device. Hence buts 0 to 7 are each connected to three terminals, bits 8 to 15 are connected to two terminals, and bits 16 to 32 are connected to only one terminal each.

Variation in the number of connected terminals gives rise to variation in the load capacitance of each of the signal lines. In general, the greater the number of connected terminals, the greater is the load capacitance. Further, variation in the load capacitance gives rise to variation in access times. This is because the larger the load capacitance, the longer the access time becomes. The operating frequency of the system LSI must be determined so as to accommodate the slowest access time. Hence variation in load capacitance impedes faster operation of the system LSI.

Moreover, in cases where for example devices are arranged on a printed circuit board (PCB), variations in the number of connected terminals complicates the wiring. This complexity increases the constraints imposed when laying out devices on the PCB.

In addition, when numerous input/output terminals are connected to a single signal line, signal reflections can no longer be neglected in some cases.

SUMMARY OF THE INVENTION

An object of this invention is to provide an external bus controller which can reduce variation in the number of input/output terminals connected to each of the signal lines of the external bus.

To this end, the external bus controller of this invention comprises a first exchange which converts the width of data input from an internal bus so as to match the data width of the external devices connected to the external bus, and which converts the width of data input from the external bus so as to match the data width of the internal bus; a recognition circuit which recognizes, for each external device, the signal lines connected to input/output terminals of the external device, among the signal lines of the external bus; a selector, which selects signal lines of the external bus to be used according to recognition results of the recognition circuit and a device specification signal; and, a second exchange, which outputs data input from the first exchange to signal lines selected by the selector, and outputs data input from these selected signal lines to the first exchange.

The external bus controller of this invention comprises a recognition circuit, selector, and second exchange, so that when an external device with data width smaller than that of the external bus is connected to the external bus, the signal lines to be used can be determined arbitrarily by the designer. Hence variation in the input/output terminals connected to the signal lines can be held to a minimum.

BRIEF DESCRIPTION OF THE DRAWINGS

Other objects and advantages of this invention are explained referring to the attached drawings.

FIG. 3 through FIG. 7 are tables used to explain the method of signal line selection of the external bus controller shown in FIG. 1;

FIG. 11 is a conceptual diagram showing the configuration of the configuration register shown in FIG. 10; and, FIG. 12 through FIG. 16 are tables used to explain the method of signal line selection of the external bus controller shown in FIG. 10.

DESCRIPTION OF THE PREFERRED EMBODIMENTS

Figure 1:
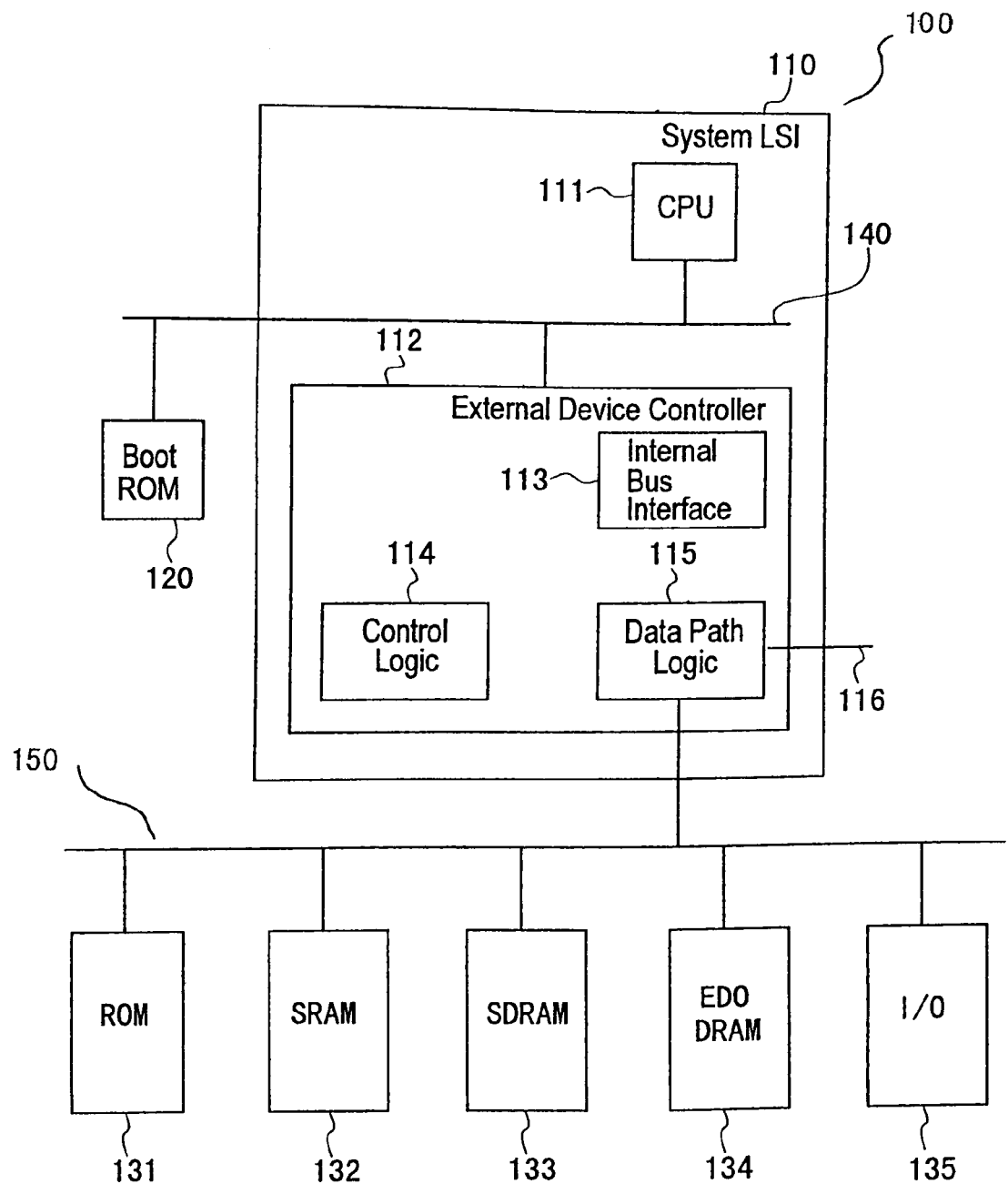
FIG. 1 is a block diagram showing the overall configuration of the external bus controller of a first embodiment.

Below, embodiments of this invention are explained using the drawings. In the drawings, the sizes, shapes, and positional relationships of constituent components are merely drawn schematically to enable comprehension; and numerical conditions described below are merely examples.

First Embodiment

First, the external bus controller of the first embodiment is explained, for the example of being formed in a system LSI.

FIG. 1 is a block diagram showing in summary the configuration of the processing system of this embodiment. As shown in FIG. 1, the processing system 100 comprises a system LSI 110; a boot ROM (read Only memory) 120; external devices 131 to 135; an internal bus 140; and an external bus 150. The system LSI 110 comprises a CPU 111 and an external bus controller 112. The CPU 111, external bus controller 112, and boot ROM 120 are interconnected via the internal bus 140. The external bus controller 112 and external devices 131 to 135 are interconnected via the external bus 150. The internal bus 140 and external bus 150 each have data lines, address lines, and control lines. In this embodiment, the data lines of the internal bus 140 and the data lines of the external bus 150 are assumed to each be 32 bits. That is, in each case the data lines comprise 32 signal lines.

The CPU 111 uses data stored in internal memory (not shown) and in external memory 131 to 134 to perform operations. In addition, the CPU 111 sends data obtained through these operations to internal memory and to external memory 131 to 134.

The external bus controller 112 controls the external devices 131 to 135 via the external bus 150. The external bus controller 112 comprises an internal bus interface 113, control logic 114, and data path logic 115.

The internal bus interface 113 performs communication between the external bus controller 112 and the internal bus 140, according to the protocol of the internal bus 140.

The control logic 114 controls the data path logic 115, and controls communication with the external devices 131 to 135. For this control, signals received from the address bus and control bus of the internal bus 140, as well as signals read from the boot ROM 120, are used.

The data path logic 115 sets the communication path between the external bus controller 112 and external devices 131 to 135, under control of the control logic 114. The data path logic 115 comprises a plurality of configuration pins 116. Using the configuration pins, settings for selection of external bus signal lines are made for each of the external devices 131 to 135. In this embodiment, two configuration pins, that is, two bits, are used for one external device. In the example of FIG. 1, five external devices 131 to 135 are connected to the external bus 150, so that ten configuration pins are used. The internal structure of the data path logic 115 is described later, using FIG. 2.

The boot ROM 120 stores information relating to the external devices 131 to 135, for example, the external device types and data widths.

The external devices 131 to 135 are memory devices, I/O devices, or similar. In the example of FIG. 1, the external device 131 is ROM, the external device 132 is SRAM (static random-access memory), the external device 133 is SDRAM (synchronous dynamic random-access memory), the external device 134 is EDO DRAM (extended data-out dynamic random-access memory), and the external device 135 is an I/O (input/output) circuit. The data input/output terminals (not shown) of these external devices 131 to 135 are connected to the data bus in the external bus 150.

Figure 2:
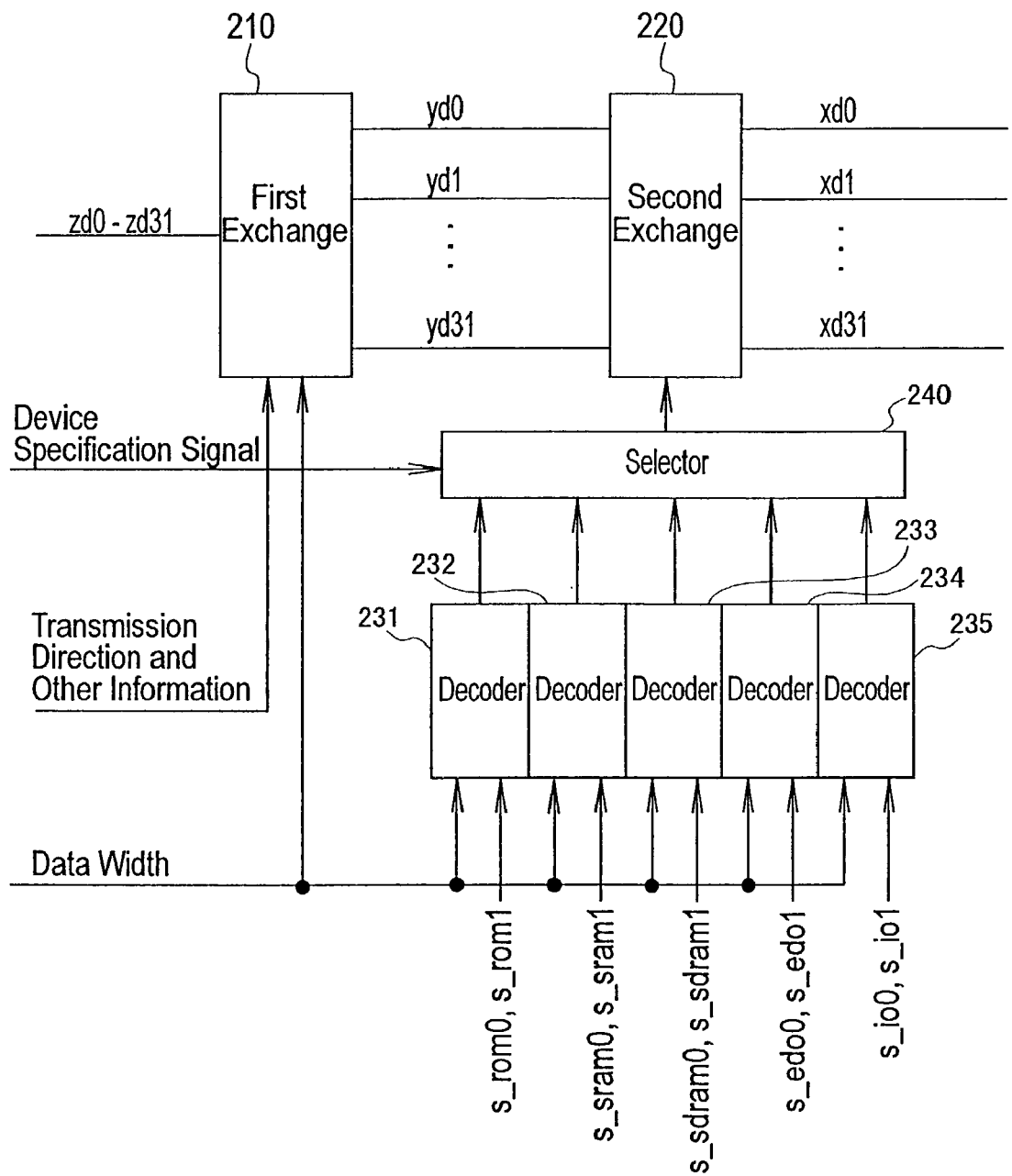
FIG. 2 is a block diagram showing the internal configuration of the data path logic shown in FIG. 1.

FIG. 2 is a block diagram showing an example of the configuration of principal components within the data path logic 115.

As shown in FIG. 2, the data path logic 115 comprises a first exchange 210, a second exchange 220, decoders 231 to 235, and a selector 240. In FIG. 2, the 32 signal lines comprised by the data bus of the internal bus 140 are indicated by the symbols zd0 to zd31. The 32 signal lines comprised by the data bus of the external bus 150 are indicated by the symbols xd0 to xd31. The first exchange 210 and second exchange 220 are connected by the 32 signal lines yd0 to yd31.

The first exchange 210 performs buffering of data transmitted between the internal bus 140 and external bus 150. The first exchange 210 converts the width of transmitted data according to the external device engaged in communication. For example, if the data width of an external device performing communication is 8 bits, the first exchange 210 divides the 32 bits of data received from the internal bus 140 into four groups of 8-bit data, and outputs the data in succession to the signal lines yd0 to yd7. If the data width of an external device performing communication is 16 bits, the first exchange 210 divides the 32 bits of data received from the internal bus 140 into two groups of 16-bit data, and outputs the data in succession to the signal lines yd0 to yd15. On the other hand, if the data width of an external device performing communication is 32 bits, the first exchange 210 outputs the 32 bits of data received from the internal bus 140 to the signal lines yd0 to yd31 without modification. The data width of the external device is read from the boot ROM 120. Conversely, on receiving 8 bits of data from the lines yd0 to yd7, the first exchange 210 converts this data into 32-bit data, and outputs the data to the internal bus 140. Similarly, on receiving 16 bits of data from the lines yd0 to yd15, the first exchange 210 converts this data into 32-bit data, and outputs the data to the internal bus 140. On receiving 32 bits of data from the lines yd0 to yd31, the first exchange 210 outputs the data to the internal bus 140 without modification.

The second exchange 220 performs exchanges between the signal lines yd0 to yd31 and the data bus (that is, the signal lines xd0 to xd31) in the external bus 150. For example, when 8-bit data is received from the signal lines yd0 to yd7, the second exchange 220 outputs this 8-bit data to one of the signal line groups xd0 to xd7, xd8 to xd15, xd16 to xd23, or xd24 to xd31. The signal lines being used in the external bus 150 (xd0 to xd7, xd8 to xd15, xd16 to xd23, or xd24 to xd31) are selected by the selector 240. When 16-bit data is received from the signal lines yd0 to yd15, the second exchange 220 outputs this 16-bit data to either the signal lines xd0 to xd15 or the signal lines xd16 to xd31, according to the selection signal of the selector 240. When 32-bit data is received from the signal lines yd0 to yd31, the second exchange outputs the 32-bit data to the signal lines xd0 to xd31 without modification. Conversely, when 8-bit data is received from any of the signal lines xd0 to xd7, xd8 to xd15, xd16 to xd23, or xd24 to xd31, the second exchange 220 outputs this 8-bit data to the signal lines yd0 to yd7. When 16-bit data is received from either the signal lines xd0 to xd15 or the signal lines xd16 to xd31, the second exchange 220 outputs the 16-bit data to the signal lines yd0 to yd15. When 32-bit data is received from the signal lines xd0 to xd31, the second exchange 220 outputs the 32-bit data to the signal lines yd0 to yd32 without modification.

The decoder 231 comprises two configuration pins s_rom1 and s_rom0. The data width of the ROM 131 is input to the decoder 231 from the boot ROM 120. The decoder 232 comprises two configuration pins s_sram1, s_sram0, and receives the data width of the SRAM 132 from the boot ROM 120. The decoder 233 comprises two configuration pins s_sdram1, s_sdram0, and receives the data width of the SDRAM 133. The decoder 234 comprises two configuration pins s_edodram1, s_edodram0, and receives the data width of the EDO DRAM 134. And, the decoder 235 comprises two configuration pins s_io1, s_io0, and receives the data width of the I/O circuit 135. These decoders 231 to 235 determine the signal lines of the external bus 150 to be used according to the set potentials of the configuration pins and the input data widths. The result of this determination is output to the selector 240.

The selector 240 receives from the control logic 114 a signal specifying an external device which is to communicate with the system LSI 110. The selector 240 selects one of the output signals of the decoders 231 to 235 according to this information. Output signal of the selected decoder is sent to the second exchange 220.

FIG. 3 is a table showing the method for setting the configuration pins. FIG. 3 shows the example of the ROM 131. The signal lines selected from the external data bus are determined by the setting of the configuration pins 116 and the data width. As explained above, the data widths of the external devices 131 to 135 are stored in the boot ROM 120. The configuration pins 116 are set by pulling-up or pulling-down each of the pins 116.

When the data width of the ROM 131 is 8 bits, either the signal lines xd0 to xd7, xd8 to xd15, xd16 to xd23, or xd24 to xd31 are connected to the data input/output terminals of the ROM 131. In the example of FIG. 3, the potentials of the two configuration pins (s_rom1, s_rom0) for the ROM 131 are set to (0,0) when the signal lines xd0 to xd7 are selected; are set to (0,1) when the signal lines xd8 to xd15 are selected; are set to (1,0) when the signal lines xd16 to xd23 are selected; and are set to (1,1) when the signal lines xd24 to xd31 are selected.

When the data width of the ROM 131 is 16 bits, either the signal lines xd0 to xd15 or the signal lines xd16 to xd31 are connected to the data input/output terminals of the ROM 131. In the example of FIG. 3, the potentials of the two configuration pins (s_rom1, s_rom0) for the ROM 131 are set to either (0,0) or (0,1) when the signal lines xd0 to xd15 are selected, and are set to either (1,0) or (1,1) when the signal lines xd16 to xd31 are selected.

When the data width of the ROM 131 is 32 bits, all the signal lines xd0 to xd31 of the external bus are connected to the data input/output terminals of the ROM 131. Hence all the signal lines xd0 to xd31 are selected, regardless of the potential settings of the configuration pins (s_rom1, s_rom0).

FIGS. 4 through 7 are tables showing the method for setting configuration pins corresponding to the other external devices 132 to 135. FIG. 4 shows the method for setting the configuration pins (s_sram1, s_sram0) corresponding to the SRAM 132; FIG. 5 shows the method for setting the configuration pins (s_sdram1, s_sdram0) corresponding to the SDRAM 133; FIG. 6 shows the method for setting the configuration pins (s_edodram1, s_edodram0) corresponding to the EDO DRAM 134; and FIG. 7 shows the method for setting the configuration pins (s_io1, s_io0) corresponding to the I/O circuit 135. The specific method for making settings in FIGS. 4 through 7 are the same as in the example of FIG. 3, and so an explanation is omitted.

Below, the principle of this embodiment is explained.

When the processing system 100 is designed, the designer connects the external devices 131 to 135 to the external bus 150. At this time, in the case of an 8-bit external device, the eight data input/output terminals are connected to either the signal lines xd0 to xd7, or to xd8 to xd15, or to xd16 to xd23, or to xd24 to xd31. In the case of a 16-bit external device, the 16 data input/output terminals are connected to either xd0 to xd15, or to xd16 to xd31. In the case of a 32-bit external device, the 32 data input/output terminals are connected to the signal lines xd0 to xd31. And, the designer writes information on the type and data width of the external devices 131 to 135 to the boot ROM 120. Also, the designer sets the configuration pins 116 according to the signal lines connected to the external devices (see FIGS. 3 to 7). Here, the signal lines connected to the external devices 131 to 135 are selected so as to reduce the variation in the load capacitances of the signal lines xd0 to xd31 insofar as possible. In order to suppress variation in load capacitance, it is effective to suppress variation in the number of data input/output terminals connected to each of the signal lines xd0 to xd31. For example, if the ROM 131, SRAM 132, EDO DRAM 134 and I/O circuit 135 are each 8 bits, and the SDRAM 133 is 32 bits, then by connecting the data input/output terminals of the ROM 131 to the signal lines xd0 to xd7, the data input/output terminals of the SRAM 132 to the signal lines xd8 to xd15, the data input/output terminals of the EDO DRAM 134 to the signal lines xd16 to xd23, the data output terminals of the I/O circuit 135 to the signal lines xd24 to xd31, and the data input/output terminals of the SDRAM 133 to the signal lines xd0 to xd31, the number of data input/output terminals connected to each of the signal lines xd0 to xd31 is the same (that is, two).

The CPU 111 of the system LST 110 performs initialization when power is turned on, on reset, and at other times. In this initialization, information on the types and data widths of the external devices 131 to 135 is read from the boot ROM 120, and is stored in a register (not shown) of the control logic 114.

When the CPU 111 accesses one of the external devices, firstly, information for access control is transferred from the control logic 114 to the data path logic 115. The access control information includes a device specification signal, transfer direction, and data width. Access data transmitted from the CPU 111 is input to the first exchange 210 of the data path logic 115 via the internal bus 140 and the internal bus interface 113. As described above, the first exchange 210 converts the data width of the access data so as to coincide with the data width of the external device to be accessed. However, when the data width of the external device to be accessed is 32 bits, no data width conversion is performed. Access data output from the first exchange 210 is sent to the second exchange 220 via the signal lines yd0 to yd31. In the manner described above, the second exchange selects signal lines to be used for communication from the signal lines xd0 to xd31 of the external bus 150. Access data output from the second exchange 220 arrives at the external device to be accessed via the selected signal lines. In addition, address data and control data are sent to the external device to be accessed via the address bus and control bus (not shown) in the external bus 150. On receiving the access data, the external device outputs response data. This response data is sent to the second exchange 220 via the selected signal lines of the external bus 150. The second exchange 220 transfers the response data to the first exchange 210. If the response data is 8 bits, the signal lines yd0 to yd7 are used for the transmission; if the response data is 16 bits, the signal lines yd0 to yd15 are used for the transmission; and if the response data is 32 bits, all the signal lines yd0 to yd31 are used for the transmission. When the width of the response data received from the second exchange 220 is 8 bits or 16 bits, the first exchange 210 converts the width of the response data to 32 bits. Response data output from the first exchange 210 is sent to the CPU 111 via the internal bus 140.

Figure 8:
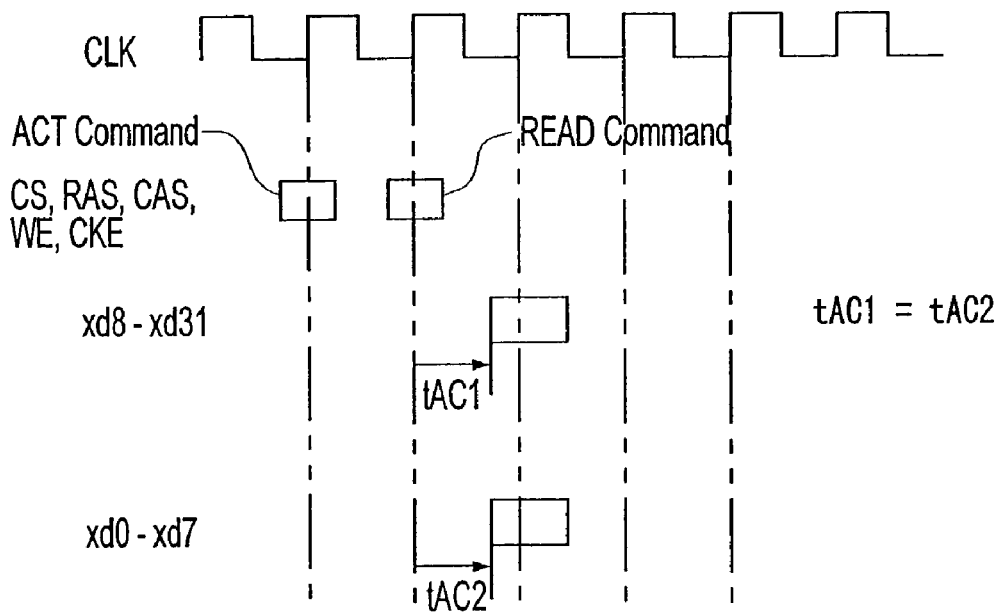
FIG. 8 and FIG. 9 are timing charts used to explain the operation of the external bus controller shown in FIG. 1.
Figure 9:
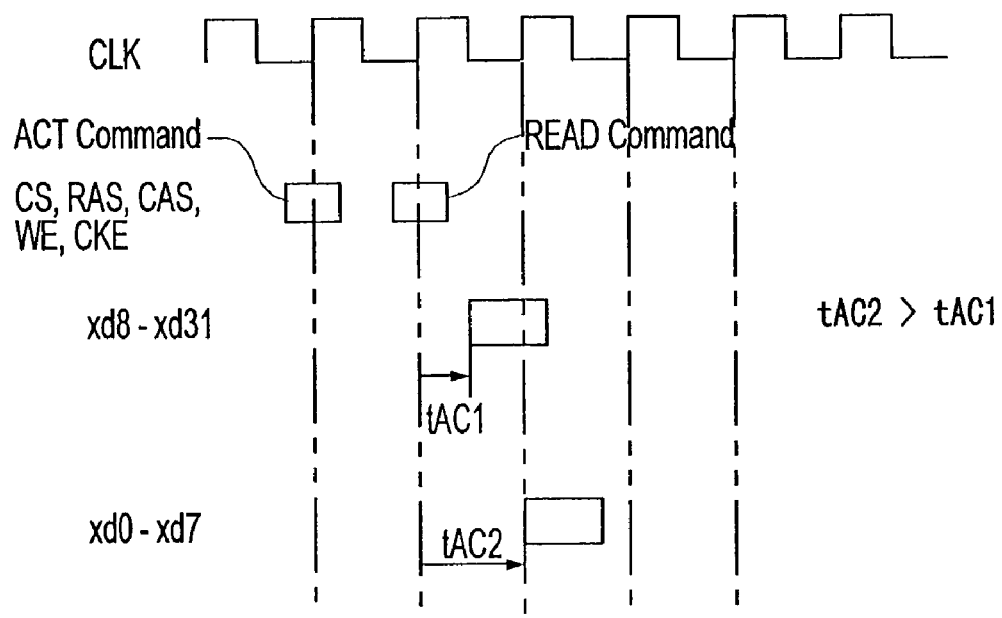

FIG. 8 is a timing chart showing the access time for the processing system 100. In the example of FIG. 8, the data input/output terminals of the ROM 131 are connected to the signal lines xd0 to xd7; the data input/output terminals of the SRAM 132 are connected to the signal lines xd8 to xd15; the data input/output terminals of the EDO DRAM 134 are connected to the signal lines xd16 to xd23; the data input/output terminals of the I/O circuit 135 are connected to the signal lines xd24 to xd31; and the data input/output terminals of the SDRAM 133 are connected to the signal lines xd0 to xd31. Consequently the processing system 100 of FIG. 8 has effectively zero variation in the load capacitance of the signal lines xd0 to xd31 comprised by the external bus 150. On the other hand, FIG. 9 is a timing chart showing access times of a processing system for comparison. The processing system for comparison differs from the processing system 100 in that the data path logic does not comprise a second exchange 220, decoders 231 to 235, and selector 240. In other words, in the processing system for comparison, 8-bit external devices are all connected to the signal lines xd0 to xd7, and 16-bit external devices are all connected to the signal lines xd0 to xd15. In the example of FIG. 9, the data input/output terminals of the ROM 131, SRAM 132, EDO DRAM 134, and I/O circuit 135 are connected to the signal lines xd0 to xd7, and the data input/output terminals of the SDRAM 133 are connected to the signal lines xd0 to xd31. Hence four data input/output terminals are connected to each of the signal lines xd0 to xd7, and only one data input/output terminal is connected to each of the signal lines xd8 to xd31. Hence in the processing system for comparison of FIG. 9, there is large variation in the load capacitance of the signal lines xd0 to xd31 comprised by the external bus 150. In FIG. 8 and FIG. 9, tAC1 and tAC2 indicate access times, that is, the time required from the output of a read command by the CPU 111 until reception of response data. Here, tAC1 is for the case in which the signal lines xd8 to xd31 are used, and tAC2 is for the case in which the signal lines xd0 to xd7 are used. As shown in FIG. 8, when the effective variation in the load capacitance is zero, the access times tAC1 and tAC2 are essentially equal. On the other hand, when as in FIG. 9 there is a large variation in load capacitance, the difference between the access times tAC1 and tAC2 is large.

In order to secure reliable operation, the operating frequency of the entire processing system must be determined according to the case of the slowest access time. Consequently the smaller the variation in load capacitance, the higher the operating frequency can be made.

In addition, when numerous data input/output terminals are connected to a single signal line, in some cases signal reflection can no longer be neglected. In the processing system of this embodiment, there are not likely to be cases in which numerous data input/output terminals are connected to a single signal line of the external bus 150, so that signal reflection tends not to occur.

Second Embodiment

Next, the external bus controller of a second embodiment is explained, for the example of being formed in a system LSI.

Figure 10:
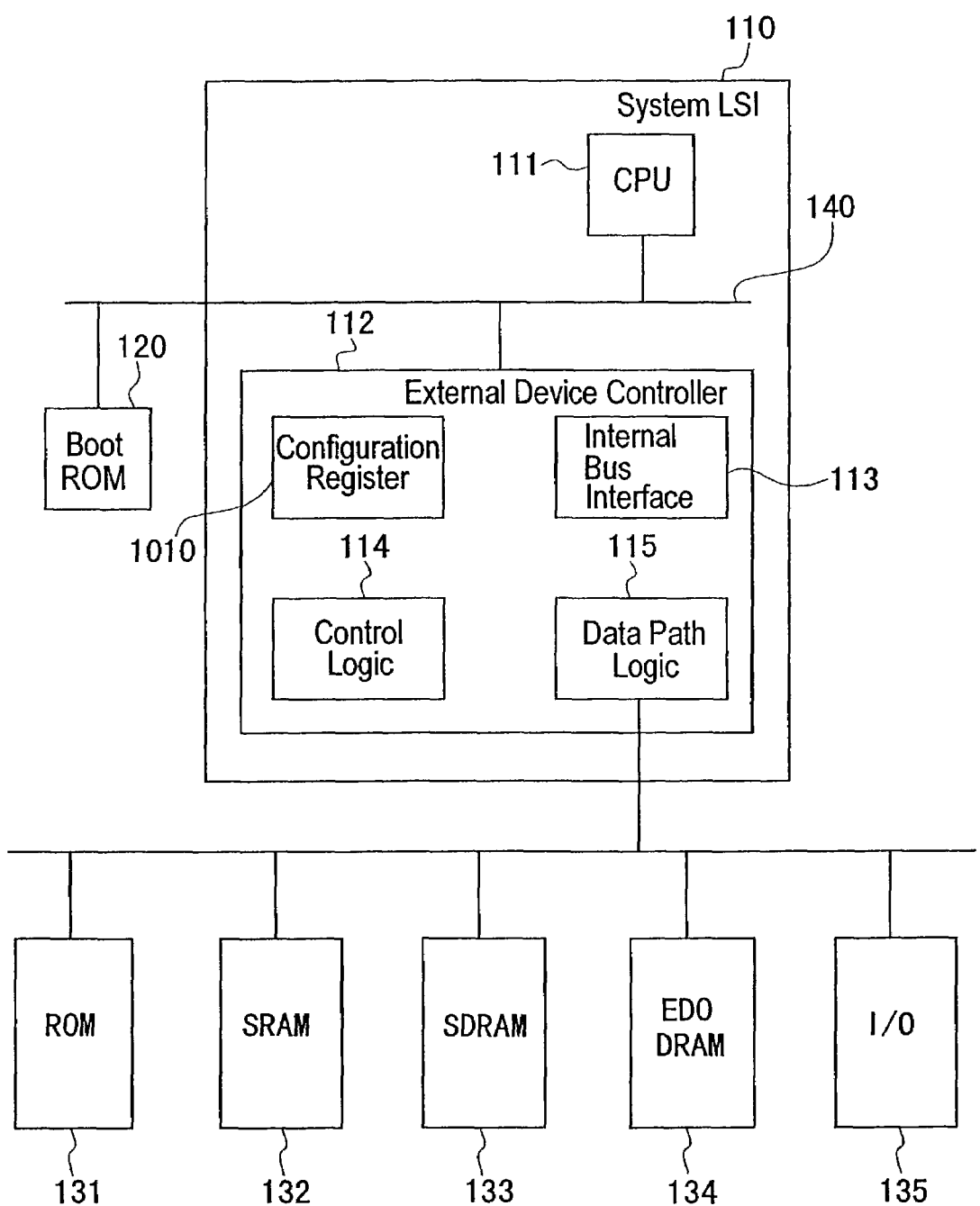
FIG. 10 is a block diagram showing the overall configuration of the external bus controller of a second embodiment.

FIG. 10 is a block diagram showing the overall configuration of the processing system of the second embodiment. In FIG. 10, components which are assigned the same symbols as in FIG. 1 are the same as in FIG. 1.

As shown in FIG. 10, the processing system of this embodiment comprises, in place of the configuration pins 116 of FIG. 1, a configuration register 1010.

FIG. 11 is a conceptual diagram showing the configuration of the configuration register 1010. As shown in FIG. 11, the configuration register 1010 holds the bits r_rom1, r_rom0, r_sram1, r_sram0, r_sdram1, r_sdram0, r_edodram1, r_edodram0, r_io1, and r_io0. Upon power-on and system reset, the configuration register 1010 receives this bit data from the boot ROM 120 (see FIG. 1), and stores this data. In addition, the configuration register 1010 supplies this bit data to the data path logic 115.

Similarly to the first embodiment, the data path logic 115 comprises a first exchange 210, second exchange 220, decoders 231 to 235, and selector 240 (see FIG. 2). However, in place of the settings of configuration pins, the values held by the configuration register 1010 are input to the decoders 231 to 235. The bits r_rom1 and r_rom0 are input to the decoder 231; bits r_sram1, r_sram0 are input to the decoder 232; bits r_sdram1, r_sdram0 are input to the decoder 233; bits r_edodram1, r_edodram0 are input to the decoder 234; and, bits r_io1, r_io0 are input to the decoder 235. Similarly to the potential settings of the configuration pins in the first embodiment, this bit data is used as information for selection of the signal lines xd0 to xd15 of the external data bus 150.

FIG. 12 is a table showing the method of selection of the signal lines xd0 to xd15, for the example of the ROM 131. The signal lines selected from the external data bus are determined by the values of the bits r_rom1 and r_rom0, and by the data width.

When the data width of the ROM 131 is 8 bits, either the signal lines xd0 to xd7, xd8 to xd15, xd16 to xd23, or xd24 to xd31 are connected to the data input/output terminals of the ROM 131. In the example of FIG. 12, the values of the bits (r_rom1, r_rom0) are set to (0,0) when the signal lines xd0 to xd7 are selected, are set to (0,1) when the signal lines xd8 to xd15 are selected, are set to (1,0) when the signal lines xd16 to xd23 are selected, and are set to (1,1) when the signal lines xd24 to xd31 are selected.

When the data width of the ROM 131 is 16 bits, either the signal lines xd0 to xd15, or the signal lines xd16 to xd31 are connected to the data input/output terminals of the ROM 131. In the example of FIG. 3, the values of the bits (r_rom1, r_rom0) for the ROM 131 are set to (0,0) or (0,1) when the signal lines xd0 to xd15 are selected, and are set to (1,0) or (1,1) when the signal lines xd16 to xd31 are selected.

When the data width of the ROM 131 is 32 bits, all the signal lines xd0 to xd31 of the external data bus are connected to the data input/output terminals of the ROM 131. That is, all the signal lines xd0 to xd31 are selected, regardless of the potential settings of the bits (r_rom1, r_rom0).

FIG. 13 through FIG. 16 are tables showing the method for setting bits corresponding to the other external devices 132 to 135. FIG. 13 shows the method for setting bits (r_sram1, r_sram0) corresponding to the SRAM 132; FIG. 14 shows the method for setting bits (r_sdram1, r_sdram0) corresponding to the SDRAM 133; FIG. 15 shows the method for setting bits (r_edodram1, r_edodram0) corresponding to the EDO DRAM 134; and, FIG. 16 shows the method for setting bits (r_io1, r_io0) corresponding to the I/o circuit 135. The specific method in FIG. 14 through FIG. 16 are the same as in the example of FIG. 13, and so an explanation is omitted.

Similarly to the controller of the first embodiment, the external bus controller of this embodiment can reduce variation in load capacitances, so that the operating frequency can be increased.

In addition, in this embodiment there are not likely to be cases in which numerous data input/output terminals are connected to a single signal line of the external bus 150, so that signal reflection tends not to occur.

Moreover, because configuration pins are not required, the number of pins of the system LSI is reduced.

In the second embodiment, bit data stored in the configuration register 1010 is recorded in the boot ROM 120;

however, configuration pins connected to the register 1010 may be used to set the bit data. The configuration pins may be specific to the register 1010, or may be used for other settings as well.

The data width of the external bus, the types and numbers of external devices, and the data widths of external devices, are not limited to the values in the examples of the first and second embodiments.

In the first and second embodiments, the case in which this invention was applied to the data bus within the external bus was explained; however, this invention can be applied to the address bus or control bus within the external bus.

In the first and second embodiments, an example is explained in which the external bus controller of this invention is formed in a system LSI; however, the external bus controller of this invention can also be implemented in a semiconductor integrated circuit other than a system LSI. Further, a semiconductor integrated circuit only comprising the external bus controller of this invention can be used in a processing system.

What is claimed is:

1. An external bus controller that controls transfer of data between an internal bus and an external bus, comprising:
   a first exchange, that converts a width of first data input thereto from the internal bus so as to coincide with a data width of an external device connected to the external bus, and outputs the converted first data, and that converts a width of second data from the external bus so as to coincide with a data width of the internal bus;
   a recognition circuit, that recognizes for each of the external devices, which signal lines of the external bus are connected to input/output terminals of the external devices;
   a selector, that selects the signal lines to be used by the external bus according to a recognition result of said recognition circuit and a device specification signal; and
   a second exchange, that outputs the converted first data input from said first exchange to the signal lines of the external bus selected by said selector, and that outputs the second data input from the signal lines of the external bus to said first exchange.

2. The external bus controller according to claim 1, wherein said recognition circuit comprises, for each external device connected to the external bus, a decoder which, by decoding used signal line information and data width information, recognizes the signal lines used by the respective external device.

3. The external bus controller according to claim 2, wherein said used signal line information is formed by potential settings of configuration pins.

4. The external bus controller according to claim 3, wherein the potentials of said configuration pins are set by applying a pull-up potential or a pull-down potential.

5. The external bus controller according to claim 2, wherein said used signal line information is formed by values stored in a configuration register.

6. The external bus controller according to claim 5, wherein said configuration register stores values read from memory connected to the internal bus as said stored values.

7. The external bus controller according to claim 2, wherein said recognition circuit reads said data width information from memory connected to the internal bus.

8. The external bus controller according to claim 1, wherein said selector receives said device specification signal from a communication-originating device connected to the internal bus.

9. The external bus controller according to claim 8, wherein said communication-originating device is a central processing unit.

10. The external bus controller according to claim 1, wherein said first exchange receives data transmission direction information from a communication-originating device connected to the internal bus, and reads data width information from a memory connected to the internal bus.

11. The external bus controller according to claim 1, further comprising an internal interface which performs interfacing between the internal bus and said first exchange.

12. The external bus controller according to claim 1, further comprising control logic which performs general control over communication using control buses and address buses within the internal bus and the external bus.

13. The external bus controller according to claim 1, wherein the external devices comprise a memory device.

14. The external bus controller according to claim 1, wherein the external devices comprise an I/O circuit.

15. The external bus controller according to claim 1, wherein the external bus and the internal bus are data buses.

16. The external bus controller according to claim 1, wherein the external bus and the internal bus are address buses.

17. The external bus controller according to claim 1, wherein the external bus and the internal bus are control buses.

18. The external bus controller according to claim 1, formed in a system LSI.

19. The external bus controller according to claim 1, formed as a single integrated circuit device.

20. The external controller according to claim 1, wherein the signal lines to said external bus which are connected to each of the external devices are selected so that variation in load capacitance between the signal lines become smallest.

21. A bus control system comprising:
    a first bus which has one or more first signal lines;
    a second bus which has plural second signal lines;
    a first device which is connected to a part of the second signal lines;
    a second device which is connected to another part of the second signal lines; and
    a bus controller which mediates communications between the first bus and the first device through said part of the second signal lines, and between the first bus and the second device through said another part of the second signal lines, so that variation in load capacitance between the second signal lines is minimized.

22. The bus control system according to claim 21, further comprising a register which stores information which indicates type and data width of the first and second devices.

23. The bus control system according to claim 22, wherein the bus controller decides a number of the second signal lines for each of the first and second devices by using the information stored in the register.

24. The bus control system according to claim 21, further comprising a third device which is connected to all of the second signal lines.

25. The bus control system according to claim 24, wherein the third device is an SDRAM.

* * * * *